Figure 1:
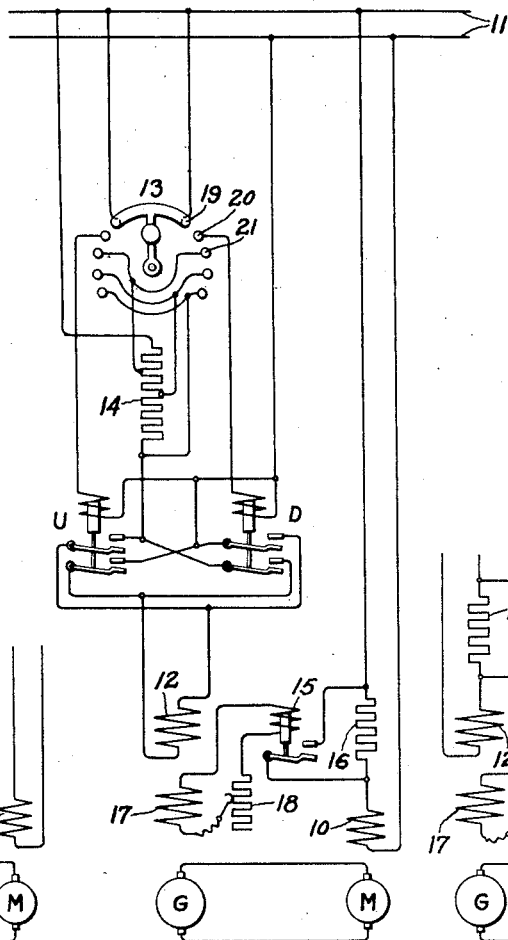

June 18, 1929.   M. A. WHITING ET AL   1,717,862
ELEVATOR CONTROL
Original Filed Jan. 22, 1926

Inventors:
Max A. Whiting,
Elliott D. Harrington,
Their Attorney.

Patented June 18, 1929.

1,717,862

UNITED STATES PATENT OFFICE.

MAX A. WHITING AND ELLIOTT D. HARRINGTON, OF SCHENECTADY, NEW YORK, ASSIGNORS TO GENERAL ELECTRIC COMPANY, A CORPORATION OF NEW YORK.

ELEVATOR CONTROL.

Application filed January 22, 1926, Serial No. 83,111. Renewed November 24, 1928.

Our invention relates to improvements in the control of electric motors, particularly electric motors operating in what is known as the Ward Leonard system, in which a separately excited generator has its armature connected in a closed local circuit with the armature of a separately excited motor, the speed control of the motor being obtained by controlling the generator field excitation.

The Ward Leonard system is now being successfully applied to the driving of electric elevators and our present invention is particularly applicable to such systems of elevator drive, although the invention is not necessarily limited thereto.

In the operation of high-speed elevators the preferred rates of acceleration and retardation are so high, and the stored energy of motion of the car and associated machinery are so considerable that the ordinary type of apparatus of this nature possesses certain undesirable speed characteristics associated with the acceleration and retardation. The elevator motor, particularly if of the gearless type, has almost inevitably a relatively high armature reaction, tending therefore to a serious loss of torque per ampere during the momentary overloads attendant upon acceleration and retardation. The gearless elevator motor has also almost inevitably a relatively high resistance of its armature circuit.

As a consequence, an apparatus of this nature tends to have the following undesirable characteristics:

The rate of acceleration for an overhauling load is considerably more rapid than for a "motoring" load (i. e. a load requiring power from the motor). The rate of retardation of an overhauling load is considerably slower than for a "motoring" load. In accelerating, the weakening of the elevator motor flux by reason of armature reaction persists momentarily after the cessation of the overload current, hence the speed, particularly at balanced or overhauling load, tends to increase momentarily above the normal full speed corresponding to the elevator load at the time; that is to say, the motor speed "overshoots".

When a means is used, such as a direct or an indirect cumulative compounding of the generator for improving the speed regulation of the motor at full-speed position of the controller, this tendency of the motor speed to "overshoot" is accentuated. Under this condition the compounding effect, which is wanted particularly at the sustained speed, tends to be strongly effective during accelerating overloads. By reason of the inherent sluggishness of the generator field such strong compounding effect exerted during acceleration persists momentarily after the accelerating overload is past, and the excess of generator excitation thus persisting causes a further tendency of the motor speed to "overshoot".

The present application is directed to an improvement of the control of dynamo electric machines for which Max A. Whiting, one of the present applicants, filed an application for Letters Patent of the United States, Serial No. 704,059, on April 3, 1924, and assigned the same to the assignee of the present application.

It is an object of our invention to improve the stability of the motor which drives the elevator or other machinery and to increase the accuracy of its response to controller movements when operated at the rapid rates of acceleration and retardation under which the described difficulties tend to occur.

It is a further object of our invention to increase, over that ordinarily obtained, the torque per ampere exerted by the motor while accelerating and retarding rapidly, thereby to improve the responsiveness of the motor to the controller movement and to reduce the motor current peaks.

It is a further object of our invention to prevent the generator from developing, near the end of the acceleration, any serious excess of voltage, thereby to minimize the tendency of the motor speed to "overshoot".

It is a further object of our invention to minimize the differences in rates of acceleration at different loads, and likewise to minimize the differences in rates of retardation at different loads.

Figure 2:
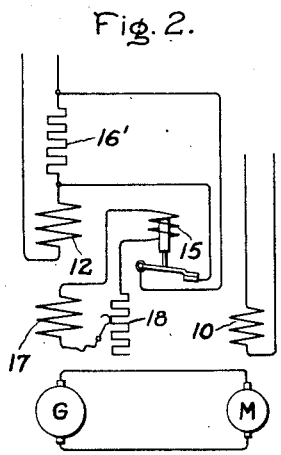
Figure 3:
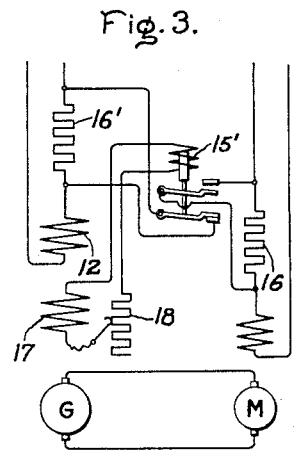

For a better understanding of the invention, reference is made to the accompanying drawing, in which Fig. 1 is a very simplified diagram of a Ward Leonard control system in accordance with the invention, in which the energization of the separately excited motor field winding is controlled in accordance with the rate-of-change of the flux of the generator; Fig. 2 is a detail of a similar control system in which the energization of the generator separately excited field winding is controlled in accordance with the rate of change of the flux of the generator; and Fig. 3 is a similar detail in which energizations of both the generator and the motor separately excited field windings are controlled in accordance with a rate of change of the flux of the generator. A motive power, typically a constant-speed motor, for driving generator G is not shown but will be readily understood. Various parts commonly necessary for application to the driving of particular classes of machinery are not shown in our figures but can be readily supplied by those skilled in the particular arts concerned. For example, although the invention finds a particular use in the application of a Ward Leonard control to elevators, various parts such as brake, limit switches, emergency switches and other parts necessary or usual in the elevator art are not shown, as those skilled in the elevator art will be readily able to apply such features to an apparatus in accordance with our invention.

Referring to the drawing, the Ward Leonard system comprises the driving motor for the elevator or other load having an armature M and a separately excited field winding 10 which is supplied from the substantially constant separate source of supply 11. This motor has its armature included in a local circuit with the armature of the generator G. The generator has a separately excited field winding 12 which is arranged to be connected to the source of supply 11 through the operation of the reversing and speed varying controller which comprises the master switch 13, the reversing contactors U and D and the resistor 14 which is under the control of the master switch 13 and is provided for varying the energization of the generator field winding 12.

The arrangement so far described is a well known Ward Leonard driving system. This system has been employed in various ways for the operation of electric elevators and the like. The difficulties encountered in the use of this arrangement, particularly for driving high-speed elevators, have been described hereinbefore.

For the overcoming of these difficulties we use two processes of control, one of which, however, we generally prefer, as follows: We apply to the motor an over-excitation of its field during the acceleration and retardation of the motor, this over-excitation being discontinued and the excitation reverting to normal after the acceleration or retardation has ceased. The increased excitation thus applied, and the consequent improvement in the ratio of field ampere-turns to armature reaction ampere-turns, prevents a serious loss of motor flux by reason of the armature reaction during the overload period of acceleration or retardation. Whether or not actually more motor flux is thus obtained during an acceleration or retardation than during normal running or stand-still depends upon the degree of over-excitation applied; in any event more flux is thus obtained than would be present if the normal flux were to suffer the maximum depletion tending to occur by reason of overload armature reaction. It will be understood by those skilled in the art how a sufficient over-excitation thus applied during an overload will prevent the motor from becoming unstable and will also insure a greater torque per ampere than otherwise obtainable. It will also be understood that since less armature current is thus required for the production of a given torque during acceleration or retardation the total variation in armature current between the acceleration of a "motoring" load and of an overhauling load will be less than ordinarily; accordingly, the difference in IR drop of the armature circuit for different loads will be less and therefore the difference in rates of acceleration at the respective loads will be less than ordinarily. For entirely similar reasons the difference in rates of retardations at different loads will be less than ordinarily.

As a convenient indicator of an acceleration or retardation and as a practical measure of the approximate rate of acceleration or retardation we have selected the change of flux of the generator. That this relation holds good will be understood from the following: Generator flux is proportional to generator voltage; generator voltage is substantially proportional to the speed of the motor which is supplied with armature current by the generator; hence rate-of-change of generator flux is proportional to rate-of-change of generator voltage which, in turn is proportional to rate-of-change of motor speed, i. e. to motor acceleration or retardation. In a secondary coil wound around the field of the generator a voltage is induced whenever the generator flux varies, the magnitude of this induced voltage being directly proportional to the rate-of-change of the generator flux, hence directly proportional, approximately, to the rate of acceleration or retardation of the motor. The voltage thus induced in a coil surrounding the generator field may therefore be utilized as a convenient means of actuation of a device used to strengthen the motor excitation during and in response to the acceleration or retardation.

Having thus explained the principles and general method in accordance with which we have devised this process of control, we proceed to explain a particular embodiment of the method, as illustrated by Fig. 1.

Field 10 of motor M is designed for normal excitation when resistor 16 is in circuit.

The generator G is provided with the separately excited field winding 12 and the secondary winding 17 about the generator field. As a matter of preferred practice we habitually use about the generator field a secondary winding of rather generous cross section as a damping winding for the purpose of modifying and adjusting the time-constant of the generator field, i. e. for the purpose of making the generator field more sluggish or less, as desired. We therefore find it convenient to utilize, as winding 17 in Fig. 1, the damping winding just mentioned. Contactor 15 is constructed to close its contacts whenever its coil is energized by a sufficiently high current induced in winding 17. The coil and magnet of contactor 15 are constructed to have a resistance and inductance of negligible effect in relation to the damping function of winding 17. Adjusting resistor 18 is not necessary to our invention but where winding 17 serves also as a damping winding this resistor 18 is convenient as a means of adjusting the damping effect.

The operation is as follows: When the controller or master switch 13 is advanced to, say, the left, the magnet of contactor U is energized so that U closes its contacts. Thus the generator field is excited, the circuit being from the upper terminal of source 11 through car switch 13, through or around all or part of resistor 14, according to the degree of advancement of master switch 13, through the upper contact of U, through generator field winding 12, thence through the lower contact of U, thence to the lower terminal of source 11. The rise of flux in generator G induces a current in winding 17 which picks up contactor 15. The pick-up of contactor 15 short-circuits resistor 16 in series with field 10 of motor M, thereby increasing the excitation of motor M above its normal value. Contactor 15 is designed to hold in at a relatively low current and accordingly maintains the increased excitation on motor M so long as an appreciable value of induced current persists in winding 17. As the generator flux approaches closely its final value, i. e. as the acceleration of the motor approaches completion, the rate-of-change of the generator flux becomes very small and the current induced in winding 17 decreases to so slight a value that contactor 15 drops open. Thereupon the excitation of motor M reverts to its normal value.

Similarly, when the master switch 13, being at the full-speed position, is then retarded to the "off" position or to a low-speed position, the decay of generator flux induces a current in winding 17 which picks up contactor 15 thereby increasing the excitation of the motor field. As the generator flux approaches closely its final value its rate-of-change becomes very small and contactor 15 drops open accordingly, whereupon the excitation of motor M reverts to normal.

Thus the excitation of motor M is increased whenever the generator flux and voltage are varied at a rapid rate, in order to obtain the beneficial effects as explained hereinbefore.

When master switch 13 is at the full-speed position in one direction and the motor is at its full-speed correspondingly, it may happen upon occasion that the master switch is quickly reversed to the opposite full-speed position. Such handling, although not the ordinary rule of operation is, in our experience, not unusual and is not abusive of the apparatus which we employ. The operation of our invention as in Fig. 1 under this particular handling of the master switch may not be obvious and is therefore explained, as follows: When the master switch is thus thrown quickly from, for example, its farthest right to its farthest left position, the generator flux begins to decay, under the influence of the reversal of the applied excitation. When the flux has decayed to zero it immediately begins to rise in the opposite direction (i. e. polarity). Now, the rise of the generator flux in the new direction or polarity induces a current in winding 17 having the same direction as had the current induced in winding 17 by the decay of the generator flux from its previous value of opposite polarity, as will be understood by those skilled in the art. The induced current in winding 17 therefore does not suffer any interruption nor discontinuity while the generator flux is thus changing rapidly and continuously from one polarity to the opposite. Contactor 15, therefore, which picked up at the beginning of the retardation, does not drop out when the generator flux crosses zero but continues to exert its effect consecutively to strengthen the motor field until the acceleration of the motor in the new direction of rotation is nearly completed.

If the master switch is arranged with numerous steps of control, so that the individual speed increments provided are small, and if this master switch is advanced or retarded slowly, one step at a time, the rate-of-change of generator flux will be so small that the current induced in winding 17 may be less than required to operate contactor 15. This, however, is not at all disadvantageous because under these circumstances the load peaks occasioned by the slight or slow movement of the master switch are small and do not tend to introduce the difficulties described for rapid rates of acceleration and retardation.

Although in apparatus according to the prior art certain of the difficulties under consideration are due more particularly to the motor characteristics, one difficulty is due to a generator characteristic as we have stated, viz: when the generator is cumulatively compounded, for the improvement of the motor speed regulation, the overcompounding of the generator occurring during the overload incident to a rapid acceleration tends to persist momentarily after the accelerating load is past, thus tending to cause an "overshoot" of the motor speed. By the use of a high degree of over-excitation of the motor field during the acceleration, as described, this particular effect of generator compounding can be at least partly overcome. Where, however, it is desirable to apply additional corrective effect to counteract the effect of the generator compounding in causing the motor speed to "overshoot", we use another process of control, as follows: During a rapid acceleration we introduce in series with the field of the generator a resistor which limits the generator excitation to less than the normal excitation corresponding to the position of the master switch, thus limiting the generator voltage to somewhat less than normal until the acceleration is nearly completed. When the acceleration is nearly completed this resistor is short-circuited to allow the generator to develop its full voltage. As a convenient means of actuating the control of this resistor, responsively to an acceleration of the motor, we use the same method explained hereinbefore, viz: a contactor actuated by the current induced in a secondary coil wound around the field of the generator.

An embodiment of this second process of control is illustrated in Fig. 2. Winding 17 and resistor 18 correspond in arrangement and functions to like-numbered parts in Fig. 1. Contactor 15 in Fig. 2 opens its contacts when its coil is sufficiently energized but is otherwise like contactor 15 of Fig. 1. Resistor 16', when not short-circuited by conductor 15, is in series with the exciting field winding 12 of generator G. The normal maximum generator excitation is obtained when resistor 16' is short-circuited.

The operation is as follows: When the master switch 13 is advanced, so that the generator field is excited, as described hereinbefore, a current will be induced in the secondary winding 17 which will pick up contactor 15, thus introducing resistor 16' in series with the generator field. Thus the generator excitation will be restrained momentarily from attaining its eventual value and thus the motor speed will be momentarily limited to less than the value which it would otherwise attain. As the generator flux approaches closely its maximum value attainable while subject to the limitation imposed by resistor 16' in series, the rate-of-change of this flux becomes very small and the current induced in winding 17 decreases to so slight a value that contactor 15 drops out and thereby short-circuits resistor 16'. Thereupon the generator excitation increases to its maximum value as determined by the master switch position.

When contactor 15 in Fig. 2 thus drops closed and short-circuits resistor 16' the consequent increase of generator excitation to its full value again induces a current in winding 17. However, as the increment of flux thus involved is small the rate-of-change of flux is also low and the current induced thereby in winding 17 at this stage of the procedure is below that which will pick up contactor 15. Accordingly contactor 15, having picked up and dropped out as explained, does not again pick up when resistor 16' is thus again short-circuited.

When master switch 13, being at the full-speed position is retarded to the "off" position or to a low-speed position the decay of generator flux induces a current in winding 17 which picks up contactor 15 thereby introducing resistor 16' momentarily in series in the generator field circuit. However, since this retardation of the master switch has either opened the generator field circuit or has at least introduced a large value of resistance, comprising resistor 14, in series, the action of contactor 15 at this time in introducing resistor 16' in circuit is merely incidental and of substantially no effect.

Where the problems of instability and of "overshooting" of motor speed are particularly severe, we employ, in conjunction, both of the foregoing processes of control. That is to say, we provide that during an ecceleration the motor field is strengthened over its normal value and the generator excitation is limited from attaining quite its full value until the acceleration is nearly completed, and that during a retardation the motor field is strengthened over its normal value.

Fig. 3 shows a particular embodiment of the method in which the two processes of control are thus combined. In Fig. 3, contactor 15' resembles the like numbered part in Fig. 1 or Fig. 2 except that in Fig. 3 contactor 15', when its coil is sufficiently energized by the induced current, short-circuits resistor 16, to strengthen the field of motor M and simultaneously introduces resistors 16' in series with field 12 of generator G, in order to limit the generator excitation. The operation of the apparatus in Fig. 3 will be understood from the preceding explanations separately of the operations of apparatus respectively in Fig. 1 and Fig. 2.

What we claim as new and desire to secure by Letters Patent of the United States, is:

1. In combination, a Ward Leonard system including a controller which controls the energization of the separately excited generator field winding, and means operated responsively to the rate-of-change of the field strength of the generator for strengthening the field of the motor during changes of field strength of the generator.

2. In combination, a Ward Leonard system including a controller which controls the energization of the separately excited generator field winding, and means operated responsively to the rate of change of the field strength of the generator for strengthening the field of the motor during acceleration and retardation of the motor.

3. In combination, a Ward Leonard system including a controller which controls the energization of the separately excited generator field winding, and means operated responsively to the rate of change of the field strength of the generator for increasing the torque of the motor per ampere of the current in the motor armature circuit during changes of field strength of the generator.

4. In combination, a Ward Leonard system including a controller which controls the energization of the separately excited generator field winding, a winding inductively related to the magnetic field set up by said generator field winding, an electromagentic switch controlled by the said inductively related winding, and a resistor in the motor field circuit controlled by said electromagnetic switch.

5. In combination, a Ward Leonard system including a controller which controls the energization of the separately excited generator field winding, a winding inductively related to the magnetic field set up by said generator field winding, an electromagnetic switch energized by the said inductively related winding, and a resistor in the motor field circuit controlled by said electromagnetic switch to increase the motor field strength while the said inductively related winding is energized.

6. In combination, a Ward Leonard system including a controller which controls the energization of the separately excited generator field winding, the said controller having a plurality of definite positions, a winding inductively related to the magnetic field set up by said generator field winding, an electromagnetic switch controlled by the said inductively related winding, and a resistor in the generator field circuit controlled by said electromagnetic switch for temporarily preventing the field current of the generator from attaining the value determined by the position in which the controller is sustained at the end of a movement of the controller from any one of a number of said controller positions to any other of the said number.

7. In combination, a Ward Leonard system including a controller which controls the energization of the separately excited generator field winding, the said controller having a plurality of definite positions, a winding inductively related to the magnetic field set up by said generator field winding, an electromagnetic switch energized by the said inductively related winding, and a resistor in the generator field circuit controlled by said electromagnetic switch to limit the impressed generator excitation to less than maximum so long as the generator field strength is varying at a substantial rate in response to a movement of said controller from any one of a number of definite positions thereof to any other of said number.

8. In combination, a Ward Leonard system including a controller which controls the energization of the separately excited generator field winding, means operated responsively to and during a high rate of change of the field strength of the generator in response to a movement of said controller for strengthening the field of the motor and for preventing the field current of the generator from attaining its maximum value determined by the position in which the controller is sustained at the end of said movement.

9. In combination, a Ward Leonard system including a controller which controls the energization of the separately excited generator field winding, a winding inductively related to the magnetic field set up by said generator field winding, electromagnetic switch mechanism energized by the said inductively related winding, a resistor in the motor field circuit controlled by said switch mechanism, and a resistor in the generator field circuit controlled by said switch mechanism.

In witness whereof, MAX A. WHITING has hereunto set his hand this 7th day of January, 1926, and ELLIOTT D. HARRINGTON has hereunto set his hand this 15th day of January, 1926.

MAX A. WHITING.
ELLIOTT D. HARRINGTON.